US00RE48759E

(19) United States
(12) Reissued Patent
Cha et al.

(10) Patent Number: US RE48,759 E
(45) Date of Reissued Patent: Sep. 28, 2021

(54) DISPLAY PROTECTOR ATTACHING APPARATUS FOR SMART DEVICE AND THE METHOD HAVING THE SAME

(71) Applicant: Whitestone Co., Ltd., Cheonan-si (KR)

(72) Inventors: Myong Jin Cha, Cheonan-si (KR); Jae-yong Jeong, Cheonan-si (KR); Jin Ho Seok, Anseong-si (KR); Han Sung Kim, Anseong-si (KR); Soongwon Lee, Cheonan-si (KR)

(73) Assignee: WHITESTONE CO., LTD., Cheonan-si (KR)

(21) Appl. No.: 16/256,762

(22) Filed: Jan. 24, 2019

Related U.S. Patent Documents

Reissue of:
(64) Patent No.: 10,091,341
Issued: Oct. 2, 2018
Appl. No.: 15/730,563
Filed: Oct. 11, 2017

(30) Foreign Application Priority Data

Aug. 4, 2017 (KR) ..... 10-2017-0098792

(51) Int. Cl.
*H04M 1/02* (2006.01)
*B29C 63/00* (2006.01)
(Continued)

(52) U.S. Cl.
CPC ..... *H04M 1/0272* (2013.01); *B29C 63/0004* (2013.01); *G03B 21/145* (2013.01);
(Continued)

(58) Field of Classification Search
CPC .. H04M 1/0272; G03B 21/145; H04N 9/3173
See application file for complete search history.

(56) References Cited

U.S. PATENT DOCUMENTS 9,169,422 B2 10/2015 O'Hare
9,248,628 B2 2/2016 Honeycutt
(Continued)

FOREIGN PATENT DOCUMENTS

KR 10-1252750 B1 4/2013
KR 101252750 B1 * 4/2013 ..... B29C 63/0004
(Continued)

OTHER PUBLICATIONS

LOCA instructional YouTube Video, https://www.youtube.com/watch?v=H18Sk61D4ls, published on Nov. 8, 2015.
(Continued)

*Primary Examiner* — Angela M Lie
(74) *Attorney, Agent, or Firm* — Bishop, Diehl & Lee, Ltd.

(57) ABSTRACT

Provided [are] *is both* a display protector attaching apparatus for a smart device and an attaching method thereof. The display protector attaching apparatus for [the] *a* smart device [of the present invention] includes a base portion provided with a [receiving groove] *recess* in which a smart device is received; a cover portion coupled to the base portion to cover *at least a portion of* the smart device received in the [receiving groove] *recess*; and a lifting supporter detachably coupled to a [coupler] *riser* provided [in] *on* the base portion to support one [side] *end* of a display protector *to be* attached to the smart device, in which when the lifting supporter is separated from the [coupler] *riser*, the display protector [is detached from] *adheres to* the display of the smart device [placed with] *by* a liquid adhesive [member to be attached to] *previously placed onto* the display.

7 Claims, 6 Drawing Sheets

(51) Int. Cl.

| | |
|---|---|
| ***G03B 21/14*** | (2006.01) |
| ***G06F 1/16*** | (2006.01) |
| ***H04N 9/31*** | (2006.01) |

(52) U.S. Cl.
CPC ..... *G06F 1/1626* (2013.01); *H04N 9/3173* (2013.01); *G06F 2200/1634* (2013.01)

(56) References Cited

U.S. PATENT DOCUMENTS

| | | | | |
|---|---|---|---|---|
| 9,264,089 | B2 * | 2/2016 | Tages | H04M 1/185 |
| 9,469,469 | B2 * | 10/2016 | Rayner | A45C 11/00 |
| 9,616,652 | B2 * | 4/2017 | Wu | B32B 43/006 |
| 9,799,242 | B2 * | 10/2017 | Takashima | G09F 13/04 |
| 9,868,274 | B2 | 1/2018 | Kim | |
| 10,100,238 | B2 | 10/2018 | Lu | |
| 2003/0121601 | A1 * | 7/2003 | Tajima | G09F 7/18 156/254 |
| 2009/0229766 | A1 * | 9/2009 | Aveldson | B32B 43/006 156/759 |
| 2010/0149452 | A1 * | 6/2010 | Harada | G02F 1/1333 349/58 |
| 2013/0335669 | A1 * | 12/2013 | Chen | G02F 1/133308 349/58 |
| 2014/0047708 | A1 * | 2/2014 | Chae | B29C 63/0004 29/700 |
| 2016/0009024 | A1 * | 1/2016 | Mason | B29C 63/02 156/249 |
| 2017/0253014 | A1 * | 9/2017 | Kleeman | B32B 37/0046 |
| 2017/0274635 | A1 * | 9/2017 | Lin | G06F 1/1626 |
| 2017/0297268 | A1 * | 10/2017 | Witham | B29C 65/48 |

FOREIGN PATENT DOCUMENTS

| | | | | |
|---|---|---|---|---|
| KR | 101252750 | B1 * | 4/2013 | B29C 63/0004 |
| WO | 2016008130 | A1 | 1/2016 | |

OTHER PUBLICATIONS

LOCA instructional YouTube Video, https://www.youtube.com/watch?v=bv_Bj6RY-Nc, published on Nov. 22, 2013.

LOCA instructional YouTube Video, https://www.youtube.com/watch?v=8e7pUESE2KE, published on Apr. 24, 2014.

amFilm's Full Screen (Edge to Edge) 3D Curved Tempered Glass Screen Protector for use with the Galaxy S6, Jul. 2015, available at https://www.amazon.com/dp/B00ZEEXWHK#customerReviews.

The Editorial Staff, Products on Display at Display Week 2012, May 1, 2012, SID 2012 International Symposium, Seminar, and Exhibition, available publicly at www.sid.org.

Translation of KR 10-1252750.*

* cited by examiner

DISPLAY PROTECTOR ATTACHING APPARATUS FOR SMART DEVICE AND THE METHOD HAVING THE SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This application claims the benefit of Korean Application No. 10-2017-0098792 filed on Aug. 4, 2017 with the Korean Intellectual Property Office, the disclosure of which is incorporated herein by reference.

TECHNICAL FIELD

The present invention relates to a display protector attaching apparatus for a smart device and an attaching method thereof[, and more]. *More* particularly, to a display protector attaching apparatus for a smart device and an attaching method thereof capable of easily and efficiently attaching a display protector to a display of a smart device using a liquid adhesive[member].

BACKGROUND ART

[In recent years,] *Because* smart devices (*e.g.,* Mobile *Phone*/Tablet) are *such* high-priced products [and have], *industry has developed* a structure that protects [a] *the* touch *screen cover glass* panel [by applying a display unit, that is, a flat or 2.5D and 3D cover glasses] on the front. [Such a] *The* cover glass *is fragile and* has a high risk of being damaged or broken due to physical shock or falling.

When the cover glass is damaged or broken, *the* cost of *repair can be* about 30 to 40% of the smart device [is required during repairing, and a lot of time of at least 2 hors to 2] *initial cost. Further, it may take* days [is taken] for repairing *or replacing the cover glass*. [Also] *In the meantime*, the *display* appearance [is] *can be quite* poor and the surface [is] *may have* sharp [to] *edges. Ultimately, the damage will* cause [floating and] malfunctioning *of the device*.

[However] *Nonetheless*, when the cover glass of [the] *a* smart device is damaged or broken, [due to] the high [repairing] *repair* cost[, the smart device is] *and potential long delay* often [used by abiding] *results in a user accepting* the above-mentioned inconveniences and risks[, and a small] *by continuing to use the device. Minor* damage such as scratches [is] *are* often *completely* neglected.

Accordingly, [improvements] *an improvement* that [general] *allows* consumers [can] *to* easily attach a protective glass or protective film to the display of the smart device are required.

[The above-described technical structure is a background technique for helping in understanding of the present invention, and does not refer to conventional techniques widely known in the art to which the present invention belongs.]

[PRIOR ART DOCUMENT]

[Patent Document]

[Korean Patent Registration No. 10-1252750 (Applicant: Dastec Co., Ltd.) (Date of Registration: Apr. 3, 2013)]

[DISCLOSURE]

[Technical Problem]

The present invention has been made in an effort to *provide* a display protector attaching apparatus for a smart device and an attaching method capable of easily and efficiently attaching a display protector to a display of a smart device using a liquid adhesive [member].

[Technical Solution] *Summary of the Invention*

An exemplary embodiment of the present invention provides a display protector attaching apparatus for [the] *a* smart device including: a base portion [provided with] *having* a [receiving groove] *recess* in which a smart device is received; a cover portion [coupled] *which couples* to the base portion [to cover] *over* the smart device received in the [receiving groove] *recess*; and a lifting supporter detachably coupled to a [coupler] *riser* provided [in] *on* the base portion, *the lifting supporter being configured* to support one side of a display protector *to be* attached to the smart device. *In use*, [in which] when the lifting supporter is separated from the [coupler] *riser*, the display protector [is detached from the display of the smart device placed with a liquid adhesive member to be attached] *adheres* to the display *using a clear liquid adhesive previously placed on the display*.

The base portion [may include] *includes* a base body [provided with the receiving groove;] *having a recess* and [the coupler provided] *a riser positioned* at one [side] *end* of the base body and detachably coupled with [the] *a* lifting supporter.

A stepped groove on which the cover portion is seated may be provided on [the] *an* upper surface of the base body.

The cover portion [may include] *includes* a cover body detachably coupled to [the] *an* upper surface of the base body and [provided with] *includes* an opening [hole] at the center; and an [edge portion provided to protrude] upwardly [from the] *turned* edge *on the periphery* of the opening [hole, in which the]. *The* edge [portion may have] *includes* a [cutting portion guiding] *gap to allow* one side of the lifting supporter coupled to the [coupler] *riser* to enter the opening [hole].

The lifting supporter [may include] *includes* a [lifting support body detachably coupled to the coupler; and a] stopper [provided in the lifting support body] to restrict a moving distance of the lifting support [body]. The lifting supporter may further include a handle [provided in the lifting support body].

The display protector attaching apparatus may further include an adhesive [member] injection portion *which* detachably [coupled] *couples* to the base portion to [inject] *facilitate injection of* the liquid adhesive [member] to the display of the smart device [received] *while positioned* in the [receiving groove] *recess*.

Another exemplary embodiment of the present invention provides an attaching method of a display protector for a smart device including: [seating] *positioning* a smart device in a [receiving groove] *recess* of a base portion provided with the [receiving groove] *recess*; dropping [a] *an amount of* liquid adhesive [member] on a display of the smart device; *supporting an end of the display protector above the device display with a removable lifting supporter coupled to a riser on the base portion;* and attaching the display protector to the display by [separating a] *removing the* lifting supporter [detachably coupled to a coupler of the base portion to support one side of the display protector from the coupler] *to allow the display protector to cover the display of the device.*

[Advantageous Effects]

[According to the exemplary embodiments of the present invention, when a lifting supporter is separated from a coupler, the display protector is detached from the display for the smart device placed with a liquid adhesive member to be attached to the display, thereby easily and stably attaching the display protector.]

[MODES] *DETAILED DESCRIPTION* OF THE INVENTION

Figure 1:
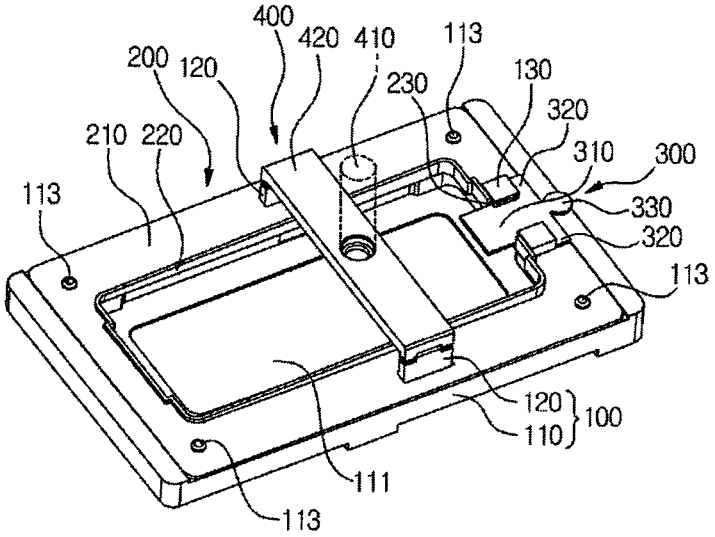
FIG. 1 is a diagram schematically illustrating a display protector attaching apparatus for a smart device according to an exemplary embodiment of the present invention.

In order to fully understand the [present invention,] operational advantages [of the present invention] and objects achieved by implementing the present invention, the [prevent] invention will be described with reference to the accompanying drawings [which illustrate] *illustrating* preferred embodiments [of the present invention and the contents illustrated in the accompanying drawings]. [Hereinafter, preferred exemplary embodiments of the present invention will be described in detail with reference to the accompanying drawings.] Like reference numerals illustrated in the respective drawings designate like members.

In the present exemplary embodiment, a smart device includes a smart phone or a tablet, and a display protector may include a protective glass or a protective film.

Figure 2:
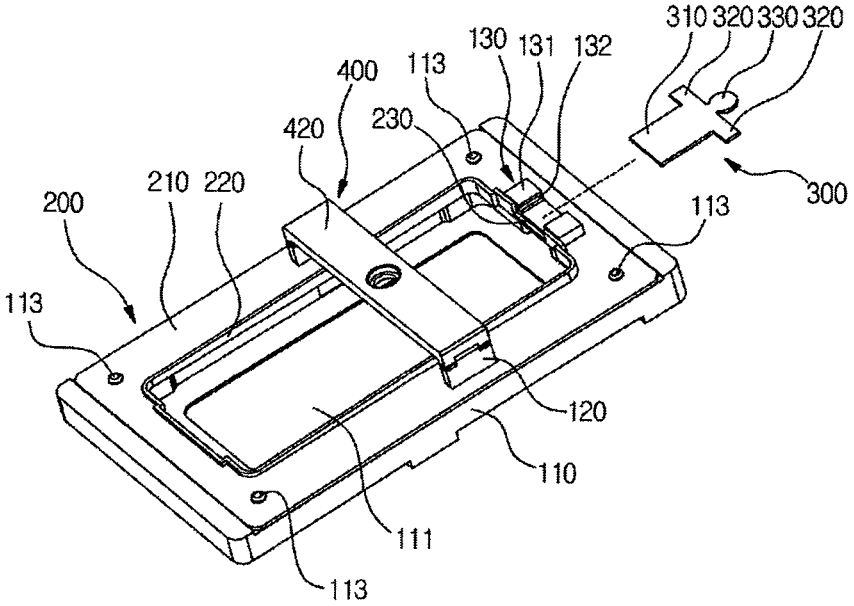
FIG. 2 is a diagram illustrating that a lifting supporter is separated in FIG. 1.
Figure 3:
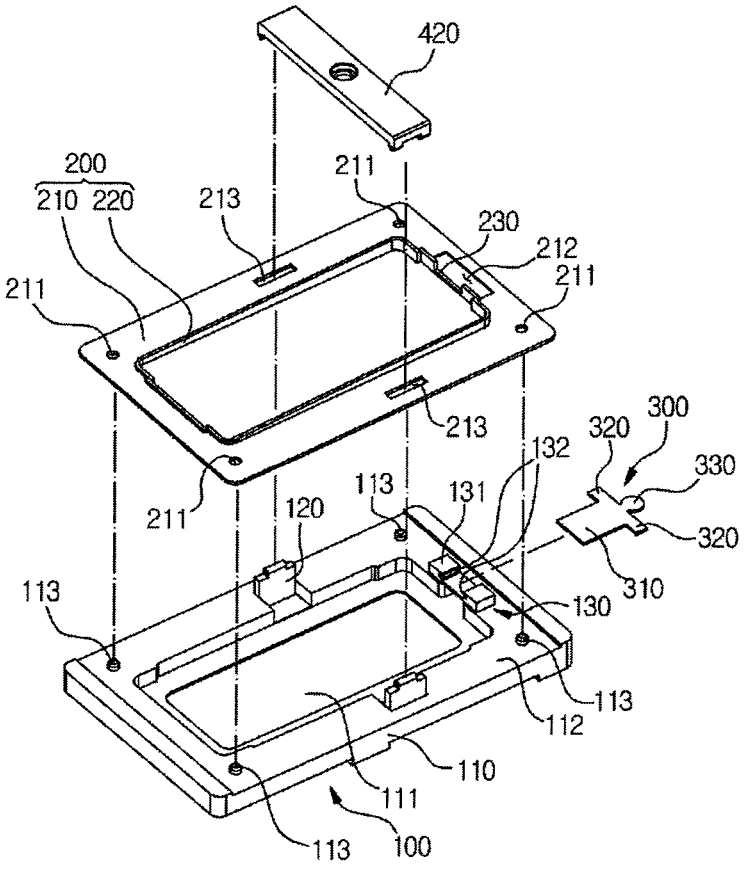
FIG. 3 is an exploded perspective view of FIG. 1.

[FIG. 1 is a diagram schematically illustrating a display protector attaching apparatus for a smart device according to an exemplary embodiment of the present invention, FIG. 2 is a diagram illustrating that a lifting supporter is separated in FIG. 1, and FIG. 3 is an exploded perspective view of FIG. 1.]

As illustrated in the drawings, a display protector attaching apparatus 1 for a smart device [according to the exemplary embodiment] includes a base portion 100 provided with a [receiving groove] *recess* 111 in which a smart device S is received, a cover [portion] 200 coupled to the base portion 100, a lifting supporter 300 detachably coupled to a [coupler] *riser* 130 provided in the base portion 100 to support one side of a display protector P *to be* attached to the smart device S, and an adhesive [member] injection portion 400 detachably coupled to the base portion 100 to inject a liquid adhesive [member] to the display of the smart device S received in the [receiving groove] *recess* 111.

Figure 4:
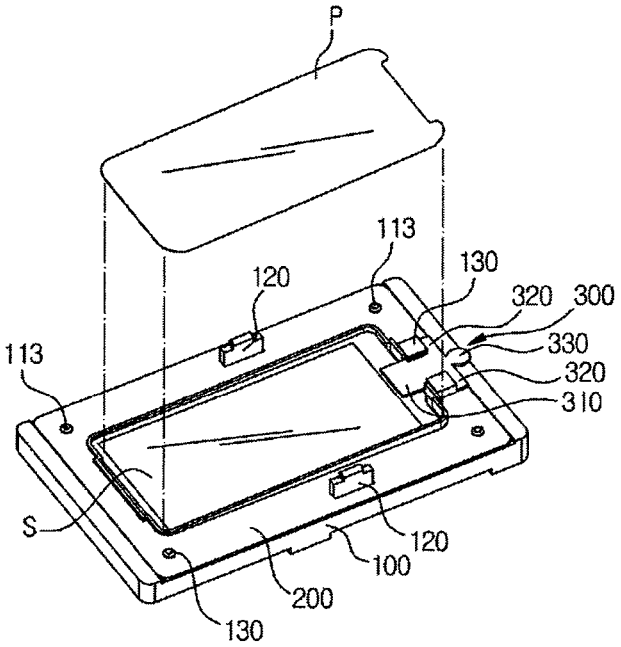
FIG. 4 is a diagram illustrating a state before a display protector is supported by the lifting supporter [as a used state in Example].

The base portion 100 is provided as a place where the smart device S is stably received as illustrated in FIG. 4 and includes a base body 110 provided with the [receiving groove] *recess* 111, a pair of embossed portions 120 spaced apart from an upper side of the base body 110, and a [coupler] *riser* 130 provided at one [side] *end* of the base body 110 and provided as a detachably coupling place of the lifting supporter 300, as illustrated in FIG. 3.

As *further* illustrated in FIG. 3, the base body 110 of the base portion 100 may have a flat hexahedral shape elongated in a lateral direction and the [receiving groove] *recess* 111 in which the smart device S is received may be provided in an area except for edges. [In the exemplary embodiment, as illustrated in FIG. 3, a] *A* stepped groove 112 and a coupling embossed portion 113 may be provided on the upper surface of the base body 110. [In the exemplary embodiment, as] *As* illustrated in FIG. 1, a cover body 210 [may be] *is* received in the stepped groove 112 and [the cover body 210 provided with a] *aligned using* coupling [groove] *holes* 211 [may be coupled and fixed] *which couple* to the [coupling] embossed [portion] *portions* 113.

As illustrated in FIG. 1, [an] end [portion] *portions* of [a] bushing 420 may be detachably fitted to [the] *a* pair of [embossed portions] *legs* 120 of the base portion 100. [In the exemplary embodiment, the] *The* pair of [embossed portions] *legs* 120 may [also be provided in a depressed shape depressed] *alternatively be extended* downwardly [of] *from the bushing 420 and connect to* the base body 110, instead of [a] *an upwardly* protruded shape illustrated in FIG. 3.

As illustrated in FIG. 3, the [coupler] *riser* 130 of the base portion 100 may be provided at one longitudinal edge of the base body 110 and [may be provided as] *provides* a detachably coupling place [of] *for* the lifting supporter 300.

[In the exemplary embodiment, as] *As further* illustrated in FIG. 3, the [coupler] *riser* 130 includes a [coupling] body 131 provided on the upper surface of the stepped groove 112 and [with] a cut central portion[, and] *having* a [coupling] groove 132 [provided at the cut central portion of the coupling body 131] *to allow sliding insertion of the lifting supporter 300.*

[In the exemplary embodiment, the lifting supporter 300 may be detachably fitted to the coupling groove 132.]

The cover [portion] 200 [is coupled] *couples* to the stepped groove 112 of the base body 110 [illustrated in FIG. 3] to cover an upper area of the base body 110. [In the exemplary embodiment, as illustrated in FIG. 3, the] *The* cover [portion] 200 includes a cover body 210 having a shape corresponding to the base body 110 and an opened central portion, an edge portion 220 [provided to protrude] *which protrudes* upwardly from the opened central portion [of the cover body 210 and provided as]. *The cover 200 also provides* a moving path [of a] *for the* lifting support body 310.

As [illustrated in FIG. 3, in] *previously stated,* the cover body 210 [of the cover portion 200,] *includes* a plurality of coupling holes 211, a [coupler] *riser* through hole 212, and a plurality of embossed through holes 213 [are provided]. [In the exemplary embodiment, the] *The* plurality of coupling holes 211 [is coupled] *couple* to the plurality of embossed through holes 213, the [coupler] *riser* 130 penetrates [into] the [coupler] *riser* through hole 212, and the plurality of embossed portions 120 penetrates [into] the plurality of embossed through holes 213[, and as]. *As* a result, the cover body 210 is supported to stably maintain the coupled position.

Figure 5:
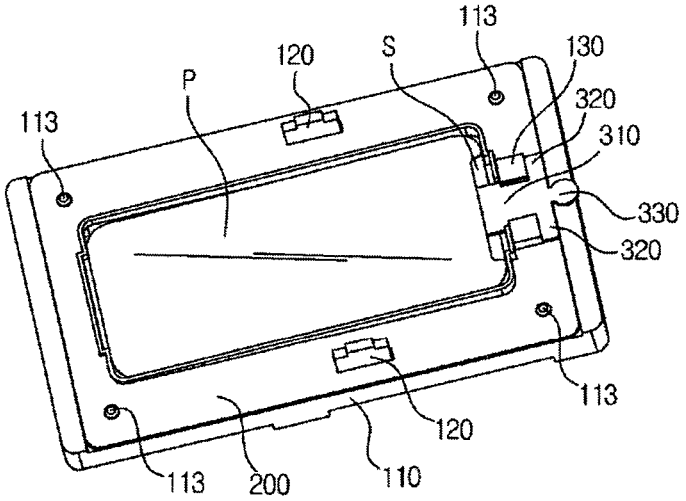
FIG. 5 is a diagram illustrating a state where one side of the display protector is supported by the lifting supporter [as a used state in Example].

The lifting supporter 300 [is coupled to] *engages* the [coupler] *riser* 130, as illustrated in FIG. 1, and supports one [side] *end* of the display protector P so that *the* one [side] *end* of the display protector P is lifted from the upper surface of the display of the smart device S [as illustrated in FIG. 5].

[In the exemplary embodiment, as illustrated in] *Referring to* FIG. 2, the lifting supporter 300 includes a lifting support body 310 having a flat plate shape, of which the edge is fitted to the [coupling] groove 132, a stopper 320 provided at both edges of the lifting support body 310 [and restricting a] *to restrict the* moving distance, that is, an insertion depth of the lifting support body 310 as illustrated in FIG. 1, and a handle 330 provided [in] *at an end* the lifting support body 310.

The adhesive [member] injection portion 400 serves to [inject] *facilitate injection of* the liquid adhesive [member into] *onto* the display of the smart device S received in the [receiving groove] *recess* 111 of the base body 110. In the exemplary embodiment, the adhesive [member] injection portion 400 includes a container 410 and a bushing 420 [of which the]. *The* container 410 is coupled to [the] *an* upper side *of the bushing 420* and [the] *a* lower side *of the bushing 420* is fitted to the pair of embossed portions 120 *attached to the cover body 210*. In the container 410 [of the adhesive member injection portion 400,] the liquid adhesive [member, for example], [a] *which can be any* known liquid adhesive [by which] *suitable for attaching* the display protector P [is attached] to the display of the smart device S [may be] *is* stored. [In the exemplary embodiment] *Preferably*, the container 410 [may be] *is* screw-coupled to the bushing 420. [The bushing 420 of the adhesive member injection portion 400 may be fitted to the pair of embossed portions 120, holes are]. *A hole* provided at the center of the bushing 420[, and] *allows* the liquid adhesive [member] stored in the container 410 [may] *to* be dropped [on] *onto* the display [through the holes of the bushing 420].

[Meanwhile, although] *Although* not illustrated, [the] *an* exemplary embodiment may further include a curing portion *for* curing the *adhesive used to attach the* display protector P [attached] to the display of the smart device S. [In the exemplary embodiment, the] *The* curing portion may [also cure the display protector P attached to the smart device S using known] *include an* ultraviolet [rays] *light* or [a known] heating means.

*With reference to* FIG. 4 [is a diagram illustrating a state before], a display protector *P* is *ready to be* supported by the lifting supporter [as a used state in Example,] *300 after application of the adhesive. As illustrated in* FIG. 5 [is a diagram illustrating a state where one side of], the display protector *P* is *now* supported by the lifting supporter *300* as [a used state in Example, and] *it is placed into the recess 111 to be mounted on the smart device S.* FIG. 6 [is a diagram illustrating that] *illustrates* the lifting supporter [is] *300 being* separated [in FIG. 5] *from groove 132 to allow the display protector P to adhere to the display of the smart device S.*

[Hereinafter, a used state in Example will be briefly] *The following is an example operation* described with reference to FIGS. 4 to 6.

First, as illustrated in FIG. 4, after the smart device S is received in the base body 110, the lifting supporter 300 is coupled to the [coupler] *groove 132 of the riser* 130.

Next, the liquid adhesive [member] is dropped [on] *onto* the display of the smart device S using the adhesive [member] injection portion 400 illustrated in FIG. 1.

Next, the display protector P illustrated in FIG. 4 is attached to the display of the smart device S. In this case, one [side] *end* of the display protector P is supported to be spaced apart from the upper surface of the display of the smart device S by the lifting support body 310 as illustrated in FIG. 5.

Figure 6:
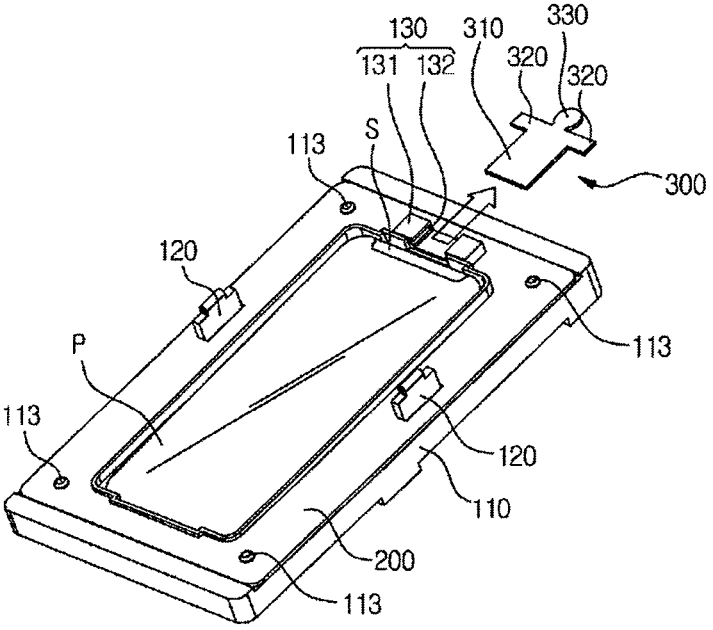
FIG. 6 is a diagram illustrating that the lifting supporter is separated in FIG. 5.

Finally, as illustrated in FIG. 6, when the lifting supporter 300 is separated from the [coupler] *groove 132 of the riser* 130, the display protector P [may be attached] *attaches* to the display of the smart device S [while] *as the* one [side] *end* of the lifted display protector P is detached from the [display] *lifting supporter 300*. In this case, [since] the liquid adhesive [member] on the upper surface of the display [is moved to the upper surface of the display while spreading or flowing] *spreads or flows* due to the detachment of the lifting supporter 300 of which one side is supported, *thereby minimizing the* bubbles generated while the liquid adhesive [member] contacts the display protector P [may be minimized].

[As described above, in the exemplary embodiment, when the lifting supporter is separated from the coupler, the display protector is detached from the display for the smart device placed with a liquid adhesive member to be attached to the display, thereby easily and stably attaching the display protector.]

The present invention is not limited to the exemplary embodiments described herein, and it would be apparent to those skilled in the art that various changes and modifications might be made without departing from the spirit and the scope of the present invention. Accordingly, it will be determined that the changed examples or modified examples are included in the appended claims of the present invention.

DESCRIPTION OF REFERENCE NUMERALS

1: Display protector attaching apparatus for smart device
100: Base portion
110: Base body
111: [Receiving groove] *recess*
112: Stepped groove
113: Coupling embossed portion
120: Embossed portion
130: [Coupler] *riser*
131: Coupling body
132: Coupling groove
200: Cover portion
210: Cover body
211: Coupling hole
212: [Coupler] *riser* through hole
213: Embossed through hole
220: Edge portion
230: Cutting portion
300: Lifting supporter
310: Lifting support body
320: Stopper
330: Handle
400: Adhesive [member] injection portion
410: Container
420: Bushing
P: Display protector
S: Smart device

What is claimed is:

1. A display protector attaching apparatus for a smart device, comprising:

a base portion provided with a [receiving groove] *recess* in which a smart device is received;

a cover portion coupled to the base portion to *partially* cover the smart device received in the [receiving groove] *recess*; and a lifting supporter detachably coupled to a [coupler] *riser* provided [in] *on* the base portion to support one [side] *end* of a display protector [attached to] *positioned above* the smart device *while seated in the recess*, wherein the lifting supporter is [constructed] *configured* to [separate] *be removed* from the [coupler] *riser to release the one end of the display protector* when [the display protector is detached from the display of the smart device placed with] a liquid adhesive [member to be attached to] *is placed onto* the display *of the smart device*, and wherein the cover portion comprises:

a cover body detachably coupled to the upper surface of the base portion wherein the cover body includes an opening [hole at the] *at a* center [constructed], *defined by an upwardly protruding edge and sized* to receive the display protector[; and],

[an edge portion provided to protrude upwardly from the edge of the opening hole,]

wherein the edge [portion has a cutting portion] *has a gap for* guiding [one side] *an end* of the lifting supporter [coupled to the coupler to enter] *into* the opening [hole].

2. The display protector attaching apparatus of claim 1, wherein the base portion includes a base body provided with the [receiving groove] *recess*; and the [coupler provided at] *riser positioned proximate* one [side] *end* of the base body and detachably coupled with the lifting supporter.

3. The display protector attaching apparatus of claim 2, [wherein] *further comprising* a stepped groove on [which the cover portion is seated is provided on the] *an* upper surface of the base body *and configured to seat the cover portion*.

4. The display protector attaching apparatus of claim 1, wherein the lifting supporter includes a lifting support body [detachably coupled to the coupler]; and a stopper provided in the lifting support body to restrict [a moving distance] *insertion* of the lifting support [body] *into the opening*.

5. The display protector attaching apparatus of claim 4, wherein the lifting supporter further [includes] *comprises* a handle [provided in the lifting support body].

6. The display protector attaching apparatus of claim 1, further comprising:

an adhesive [member] injection portion detachably coupled to the base portion to inject [the] *a* liquid adhesive [member to] *onto* the display of the smart device [received in the receiving groove] *while positioned in the recess*.

7. [An attaching] *A* method [of] *for attaching* a display protector [for] *to* a smart device, *the method* comprising *the steps of*:

seating a smart device in a [receiving groove] *recess* of a base portion [provided with the receiving groove];

placing a cover portion [comprising a cover body] on top of the base portion [already] having the smart device received therein, *wherein the cover portion comprises an opening at a center and aligned with a display of the seated smart device, the opening being defined by an upwardly protruding edge and sized to receive a display protector*;

dropping a liquid adhesive [member on a] *onto the* display of the smart device; [and]

*positioning a display protector within the opening such that one end is supported off the display of the smart device by a lifting supporter detachably coupled to a riser on the base portion; and*

[attaching the display protector to the display by] separating [a] *the* lifting supporter [detachably coupled to a coupler of the base portion to support one side of the display protector from the coupler,] *from the riser to release the supported end of display protector*

[wherein the cover body includes an opening hole at the center constructed to receive the display protector and an edge portion provided to protrude upwardly from the edge of the opening hole].

* * * * *